US012725499B2

(12) United States Patent

Martinez-Barreiro et al.

(10) Patent No.: US 12,725,499 B2

(45) Date of Patent: Sep. 1, 2026

(54) HIGH SECURITY DEVICE FOR MONITORING A DOOR, COMPARTMENT OR OTHER COVERED OPENING

(71) Applicants: AEROSENS Inc, Miami, FL (US); Turbine Kinetics, Inc., Glastonbury, CT (US)

(72) Inventors: Maria-Esther Martinez-Barreiro, Falls Church, VA (US); Reza Shibli, Raritan, NJ (US); Igor Giterman, Glastonbury, CT (US); Eric Brigham, Charlton, MA (US)

(73) Assignees: AEROSENS INC, Miami, FL (US); TURBINE KINETICS, INC., Glastonbury, CT (US)

( * ) Notice: Subject to any disclaimer, the term of this patent is extended or adjusted under 35 U.S.C. 154(b) by 14 days.

(21) Appl. No.: 18/980,675

(22) Filed: Dec. 13, 2024

(65) Prior Publication Data

US 2025/0201094 A1 Jun. 19, 2025

Related U.S. Application Data

(60) Provisional application No. 63/610,686, filed on Dec. 15, 2023.

(51) Int. Cl.
*G08B 13/24* (2006.01)

(52) U.S. Cl.
CPC ..... *G08B 13/2477* (2013.01); *G08B 13/2474* (2013.01); *G08B 13/2482* (2013.01)

(58) Field of Classification Search
CPC ............ G08B 13/2477; G08B 13/2474; G08B 13/2482; G08B 13/08; G08B 13/24; G08B 25/10
See application file for complete search history.

(56) References Cited

U.S. PATENT DOCUMENTS

| | | | | |
|---|---|---|---|---|
| 10,748,413 | B2 | 8/2020 | Martinez-Barreiro | |
| 11,214,385 | B2 | 1/2022 | Hassani et al. | |
| 2003/0011474 | A1* | 1/2003 | Ng | G06K 19/04 340/568.1 |
| 2003/0052780 | A1* | 3/2003 | Buckley | H01H 36/0046 340/547 |
| 2008/0186173 | A1* | 8/2008 | Gates | G08B 25/009 340/541 |
| 2019/0057598 | A1* | 2/2019 | Martinez-Barreiro | G08B 26/008 |
| 2020/0148383 | A1* | 5/2020 | Martinez-Barreiro | G06Q 10/20 |

* cited by examiner

*Primary Examiner* — Sisay Yacob
(74) *Attorney, Agent, or Firm* — Rabin & Berdo, P.C.

(57) ABSTRACT

An RF signaling device can be configured to detect tampering with a door or cover of an opening of a compartment or container. The RF signaling device can comprise a controller, a first switch coupled to the controller, and a second switch coupled to the controller. The first switch can be configured to detect normal opening or closing of the door or cover and signal the normal opening or closing to the controller, and the second switch can be configured to detect the tampering with the door or cover and signal the tampering to the controller.

14 Claims, 6 Drawing Sheets

SW1: Switch 1

SW 2: Switch 2

M1: Actuator magnet

SW1: Switch 1

SW 2: Switch 2

M1: Actuator magnet (see FIG. 2 for details of container door/lid, housing and gap)

SW1: Switch 1 ON

SW 2: Switch 2 OFF

M1: Actuator magnet (see FIG. 2 for details of container door/lid, housing and gap)

SW1: Switch 1 OFF

SW 2: Switch 2 OFF

M1: Actuator magnet (see FIG. 2 for details of container door/lid, housing and gap)

SW1: Switch 1 ON

SW 2: Switch 2 ON

M1: Actuator magnet

M2: Tampering magnet

HIGH SECURITY DEVICE FOR MONITORING A DOOR, COMPARTMENT OR OTHER COVERED OPENING

CROSS-REFERENCE TO RELATED APPLICATION

This application claims the benefit of the earlier filing date of provisional application No. 63/610,686, filed Dec. 15, 2023.

TECHNICAL FIELD

This application relates generally to a security system, and more specifically to a high-security RF signaling device for tracking whether a door or cover of a compartment or container is subject to unauthorized access or tampering.

BACKGROUND

Security is a paramount concern, in particular in such settings such as commercial travel by aircraft, and unauthorized access to compartments or doors can pose significant risks. Existing tamper detection systems may be limited in their capabilities.

SUMMARY

This application relates to a high-security RF signaling device designed to detect tampering with, unauthorized access to, or any other significant change in the status of a door or cover of a compartment or container that is intended to be secure. The present embodiments address the limitations of conventional systems and offer an improved solution for enhanced security and tamper detection by using multiple sensors.

In non-limiting embodiments, an RF signaling device can be configured to detect tampering with a door or cover of an opening of a compartment or container. The RF signaling device can comprise a controller, a first switch coupled to the controller, and a second switch coupled to the controller. The first switch can be configured to detect normal opening or closing of the door or cover and signal the normal opening or closing to the controller, and the second switch can be configured to detect the tampering with the door or cover and signal the tampering to the controller.

The RF signaling device can further comprise an actuator magnet. The first switch can be configured to be magnetically coupled to the actuator magnet, and to detect normal opening or closing based on proximity to or separation from the actuator magnet. The second switch can be configured to detect a presence of a tampering magnet. The second switch can be located sufficiently distant from the actuator magnet that a state of the second switch is not affected by the actuator magnet.

The RF signaling device can comprise a first part configured to be housed in or attached to the door or cover, the first part including the controller, the first switch and the second switch, and a second part configured to be housed in or attached to the compartment or container, the second part including the actuator magnet. The first switch and the second switch can be configured to take on different states to indicate the normal closing, and take on a first same state to indicate the normal opening. The first switch and the second switch can be configured to take on a second same state different from the first state to indicate the tampering. Each of the first switch and the second switch can be or include a magnetic switch. The first part can have an edge configured to be disposed opposite to an edge of the second part, and the second switch can be located sufficiently distant from the edge of the first part that the state of the second switch is not affected by the actuator magnet. The RF signaling device can be configured to communicate with a management device to report detecting of the tampering.

In non-limiting embodiments, a security system can comprise a compartment or container having a door or cover, and a security device associated with the compartment or container. The security device can include a controller, a first switch coupled to the controller, and a second switch coupled to the controller. The first switch can be configured to detect normal opening or closing of the door or cover and signal the normal opening or closing to the controller, and the second switch can be configured to detect tampering with the door or cover and signal the tampering to the controller.

The security device can comprise a first part housed in or attached to the door or cover, the first part including the controller, the first switch and the second switch, and a second part housed in or attached to the compartment or container, the second part including an actuator magnet configured to be magnetically coupled to the first switch.

In a normal closed condition of the compartment or container, the first switch and the second switch can have different states, indicating the normal closed condition, and in a normal open condition of the compartment or container, the first switch and the second switch can have a first same state, the first same state indicating the normal open condition.

In an unauthorized or tampering condition of the compartment or container, the first switch and the second switch can have a second same state different from the first same state, indicating the unauthorized or tampering condition.

Each of the first switch and the second switch can be or include a magnetic switch, and the first part can have an edge opposite to an edge of the second part. The second switch can be located sufficiently distant from the edge of the first part that the state of the second switch is not affected by the actuator magnet.

The security system can comprise a management device configured to communicate with the first part.

In non-limiting embodiments, a method can comprise, by a security device including a controller, a first switch and a second switch, detecting normal opening or closing of a compartment or container associated with the security device by the first switch, and signaling the normal opening or closing to the controller, and detecting unauthorized opening or closing of or tampering with the compartment or container by the second switch, and signaling the unauthorized opening or closing or tampering to the controller.

The detecting the unauthorized opening or closing or tampering can include detecting, by the second switch, a presence of a tampering magnet. The detecting the normal closing can include determining that the first switch and the second switch have different states. The detecting the normal opening can include determining that the first switch and the second switch have a same first state. The detecting the unauthorized opening or closing or tampering can include determining that the first switch and the second switch have a same second state different from the first state.

A detection mechanism according to the present embodiments could be or include any sensor capable of detecting opening or breach of a secured compartment. The sensor can be continuous or discrete. In non-limiting embodiments the detection mechanism can include one or more magnetic switches.

The high-security RF signaling device can detect opening and closing of the door or cover. The high-security RF signaling device can be part of a system that can further include a management device or monitoring system configured to determine the state or condition of the door or cover based on communication with the high-security RF signaling device. In particular, the high-security RF signaling device can be configured to detect and report whether the door, compartment or cover has been opened and/or closed, and to count (also, e.g., register, indicate, record) a number of times that the door or cover opens and/or closes, record whether the opening and/or closing was normal or was unauthorized, and report the number of times and whether the opening and/or closing was normal or was unauthorized to the management device. By monitoring the opening and closing of the doors, compartments or covers in this way, security and maintenance can be enhanced because damage to or tampering with, and wear and tear of, the door, cover, compartment, container or opening can be readily detected and accurately recorded.

DETAILED DESCRIPTION

In various non-limiting embodiments, the high-security RF signaling device as described herein can facilitate monitoring the opening and closing of a door or any kind of cover of an opening of a contained or bounded space, such as the opening of a compartment, container, room or other contained space.

It is to be understood that the term "door" as used herein is not limited to doors for entry and exit. For example, the term "door" with reference to the present embodiments as applied in an aircraft is not limited to doors for entry and exit by passengers and crew, but also means any kind of door on an aircraft (or any secured system), such as a door to a cockpit or a restroom. The term "door" can also apply to any kind of cover for an opening of a contained space. In an aircraft, for example, "any kind of cover" can include such things as access panel covers, hatch doors, bin doors or covers, container covers, or compartment doors or lids or covers, and the like.

The high-security RF signaling device can count (e.g., increment by one or a random or designated number to record or register an event) the number of times that the cover/door opens and/or closes ("and/or" as used herein means that the system can detect and count either the opening of the door, the closing of the door, or both the opening and closing of the door), record the count, and report the count to a management device. The high-security RF signaling device can further determine and report whether the opening or closing was authorized or unauthorized.

The high-security RF signaling device can be associated with the door and be configured to generate or output a signal or signals reporting on the state or condition of the door. By generating or outputting the signal or signals, the high-security RF signaling device can register or report or otherwise provide notification of an event that occurs in connection with the door (for example, by detecting a difference between counts before and after a breach or tampering event). The event can be, for example, the opening and/or closing of the door. Another example of the event is the count of the number of times that the door has opened and/or closed having increased by, or having reached, a particular value. Reaching a particular threshold value can indicate, for example, that maintenance should be performed on the door.

The high-security RF signaling device can be configured to generate or output a signal or signals in response to a request or query or interrogation by a management device, or independently of interrogation by a management device. Either independently or in response to the interrogation, the high-security RF signaling device can output a signal or signals indicating the count of the number of times that the door has opened and/or closed, and/or whether the opening and/or closing was authorized or a result of tampering.

Figure 1:
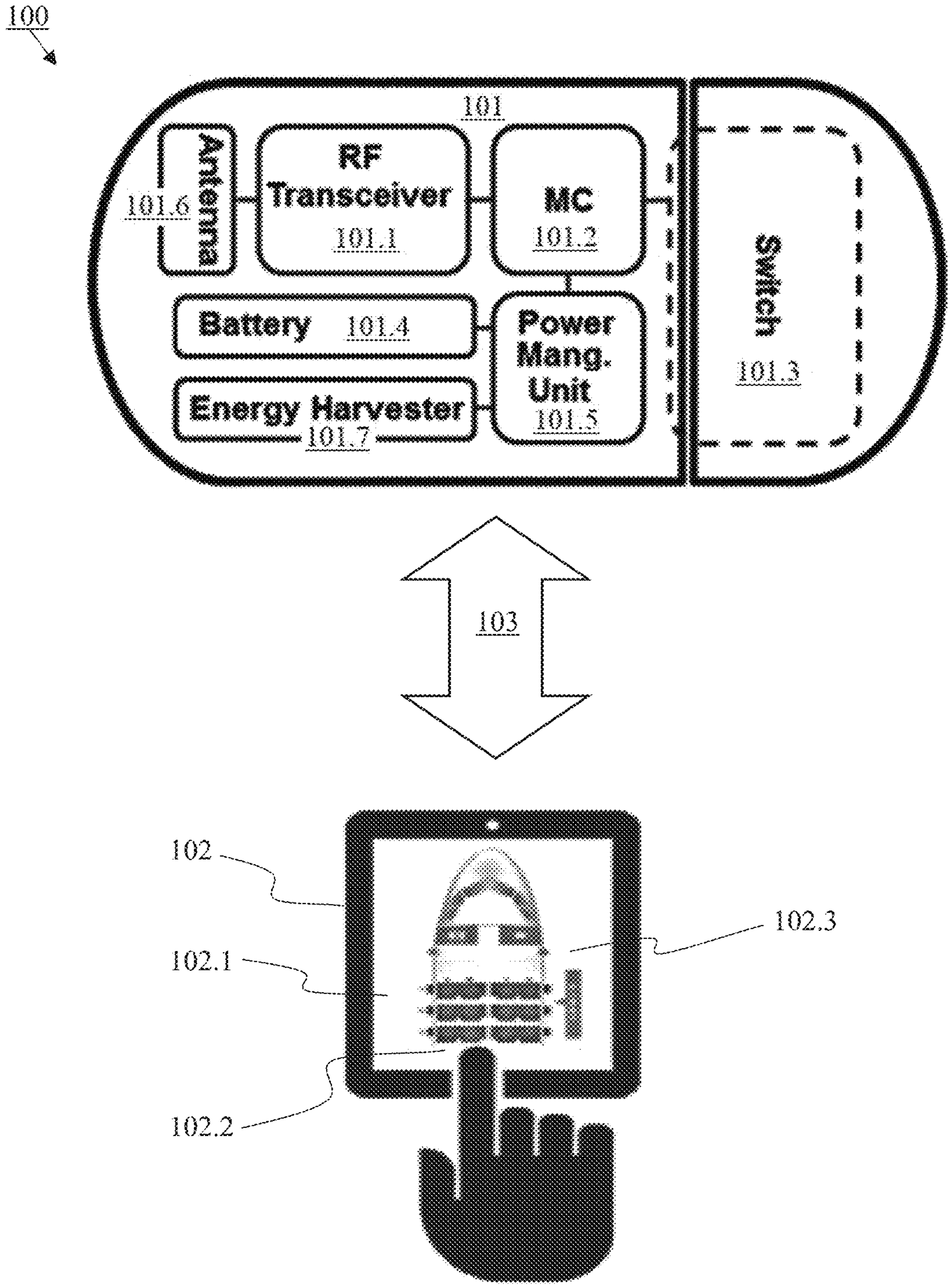
FIG. 1 RELATED ART
FIG. 1 is a block diagram showing components of a high-security RF signaling device according to the related art.

FIG. 1 shows a system 100 according to the related art. The system 100 is more fully disclosed in U.S. Pat. No. 11,214,385, the entire contents of which are fully incorporated herein by reference. Also fully incorporated herein by reference are the contents of related U.S. Pat. No. 10,748,413.

As shown in FIG. 1, the system 100 can include an RF signaling device 101 and a management device 102. The RF signaling device 101 can be or include, for example, an "RF tag" or "RFID tag" ("radio frequency identification tag"), which is a known, commercially-available product. The RF signaling device 101 can include an RF transceiver 101.1 configured to modulate and demodulate RF signals (e.g. in wireless technologies such as Bluetooth™, WiFi, and the ZigBee protocol), coupled to an antenna 101.6 configured to transmit and receive the RF signals. The RF signaling device 101 can further include a battery 101.4 configured to provide power to the RF signaling device 101, and an energy harvester 101.7 configured to harvest ambient energy, such as RF energy, kinetic energy (e.g., vibration), thermal energy or solar energy, to supplement the power provided by the battery 101.4. The battery 101.4 and the energy harvester 101.7 can each be coupled to a power management unit 101.5 configured to manage and optimize power usage by the RF signaling device 101, by controlling aspects of the operations of the battery 101.4 and the energy harvester 101.7. The RF transceiver 101.1 and power management unit 101.5 can each be coupled to a controller (or microcontroller) 101.2 configured to control operations of the RF transceiver 101.1, the antenna 101.6, the power management unit 101.5, the battery 101.4 and the energy harvester 101.7.

In non-limiting embodiments, the RF signaling device 101 can use, for example, Bluetooth™ Low Energy (BLE) technology. An operating frequency of the RF signaling device 101 can be, for example, approximately 2.402-2.480 GHz, and an operating temperature of the RF signaling device 101 can be, for example, between −20° C. and +70°

C. Dimensions of the RF signaling device 101 can be, for example, 45×34×14 mm or 1.8×1.4×0.6 in. The RF signaling device 101 can weigh, for example, 20 grams or 0.04 pounds (battery included). A housing material of the RF signaling device 101 can be, for example, ABS plastic. The RF signaling device can, for example, use one coin-cell battery and have 4 dBm output power. The BLE technology can have −93 dBm sensitivity.

The controller 101.2 can further be coupled to a detection device, such as a switch 101.3. The switch 101.3 can be, e.g., a magnetic or mechanical switch. The switch 101.3 can be configured to detect an occurrence of an event, as described above, in connection with an aircraft door associated with the RF signaling device 101. For example, the switch 101.3 can assume one of an off state or an on state based on or in response to the aircraft door being opened and/or closed. The controller 101.2 can receive a signal from the switch 101.3 indicating the state or condition of the switch 101.3 and can perform operations in response to the signal. Specifically, for example, in response to the detection device 101.3 detecting that the aircraft door has opened and/or closed, the controller 101.2 can increment a counter that stores a count of the number of times that the aircraft door has opened and/or closed. The controller 102.2 can further cause the count to be reported to a management device.

To this end, the RF signaling device 101 can transmit and receive information 103 under control of the controller 101.2. For example, the RF signaling device 101 can transmit information 103 to, and receive information 103 from, a management device 102. The information 103 can be in the form of modulated electromagnetic radiation transmitted by the RF transceiver 101.1 and the antenna 101.6 in response to control signals from the controller 101.2, or modulated electromagnetic radiation received by the antenna 101.6, and processed and interpreted by the RF transceiver 101.1 and the controller 101.2.

The management device 102 can include a display device 102.1 configured to generate display information 102.3 including any one of, or a combination of, images and text. The management device 102 can further include an input device 102.2 configured to receive input from a user to control operations performed by the management device 102. The input device 102.2 can include any kind of device or interface for communicating user input to the management device, such as but not limited to a touch-sensitive display screen, a keyboard, voice-activated control or the like. The management device 102 can be or include, for example, a smartphone, a tablet or other handheld device having a graphical user interface for interactive user control of the management device 102.

Figure 2:
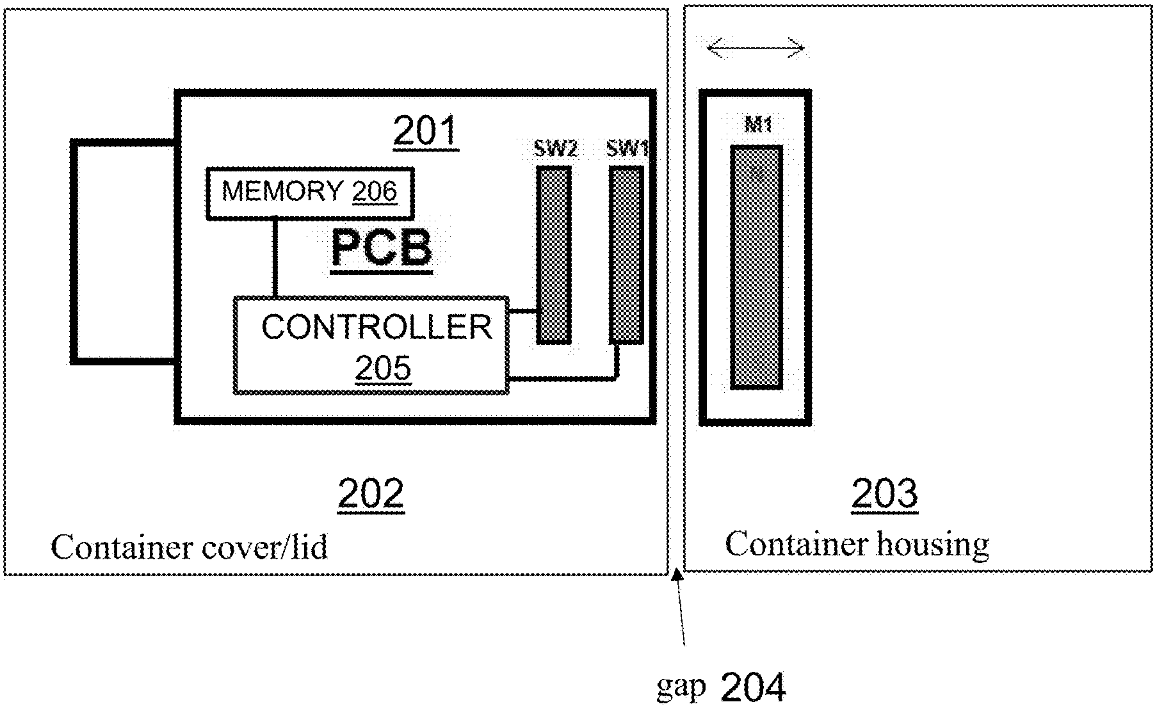
FIG. 2 is a diagram of the high-security RF signaling device with multiple switches according to a novel and non-obvious embodiment of a high-security RF signaling device.

FIG. 2 shows a system for implementing a high-security RF signaling device according to the present embodiments. The system can include some or all of the components described above in connection with FIG. 1. For example, a PCB (printed circuit board) 201 of the system 200 can include a transceiver 101.1, an antenna 101.6, a battery 101.4, an energy harvester 101.7, a power management unit 101.5, and a controller 101.2 as shown in FIG. 1. The PCB 201 can be configured to communicate with a management device like management device 102 described with reference to FIG. 1. However, the PCB 201 is not limited to the configuration shown in FIG. 1, and other configurations are possible. In FIG. 2, a controller 205 can correspond, for example, to a controller 101.2 as shown in FIG. 1, or could be a different controller with the same or similar capabilities as the controller 101.2.

Moreover, differently from FIG. 1, the PCB 201 can include a first switch SW1 and a second switch SW2. The controller 205 of the PCB 201 can be coupled to the first switch SW1 and the second switch SW2, and can transmit signals to and receive signals from the first switch SW1 and the second switch SW2. Each of the first switch SW1 and the second switch SW2 can be or include a magnetic switch, meaning a switch that changes in state in response to the proximity of a magnetic field.

The first switch SW1 and the second switch SW2 can be mounted on, attached to, housed within or otherwise associated with the PCB 201. The PCB 201 can be configured to be mounted on, attached to, housed within or otherwise associated with a container cover/lid/door 202 for covering an opening of a bounded space such as a compartment, container, room and the like, as described previously. A container/container housing 203 can be disposed opposite to the container cover 202. An actuator magnet M1 can be mounted on, attached to, housed within or otherwise associated with the container 203.

The second switch SW2 can be configured to detect an attempt to breach, e.g., tamper with or access without authorization, the system implementing the high-security RF signaling device, or to detect an attempt to override the security of the system. The second switch SW2 can be located away from an edge of the PCB 201, and therefore require a stronger magnetic field for actuation due to the proximity of the actuator magnet M1 than would be the case if the second switch SW2 were closer to the actuator magnet M1. The second switch SW2 can be located sufficiently distant from the actuator magnet M1 that a state of the second switch SW2 is not affected by the actuator magnet M1. The first switch SW1 and the second switch SW2 can have the same or different sensitivity.

The first switch SW1 can be configured to detect opening and/or closing of the container 203. Here, opening of the container 203 means causing the container cover/lid/door 202, by direct manipulation or otherwise, to be separated from the container housing 203 such that, in normal circumstances, an authorized opening event is recorded/counted. Closing of the container 203 means causing the container cover/lid/door 202, by direct manipulation or otherwise, to be brought into proximity to the container housing 203 such that, in normal circumstances, an authorized closing event is recorded/counted.

The first switch SW1 can be magnetically coupled to the actuator magnet M1 across a gap 204 between the container 203 and the actuator magnet M1. As described previously, the actuator magnet M1 can be mounted on, attached to, housed within or otherwise associated with the container 203, or otherwise located so as to be magnetically coupled to the first switch SW1. The first switch SW1 can detect opening and/or closing of the container 203 due to breaking of contact/magnetic coupling between the first switch SW1 and the actuator magnet M1 by movement of the container cover 202 sufficiently far from the actuator magnet M1. In response to the opening and/or closing of the container 203, the PCB 201, for example due to a signal from the first switch SW1 transmitted to the controller 205 of the PCB 201, can increment a counter that stores a count of the number of times that the container 203 has opened and/or closed. The counter can be a memory within the controller 205, or can be external to the controller 205.

Figure 5:
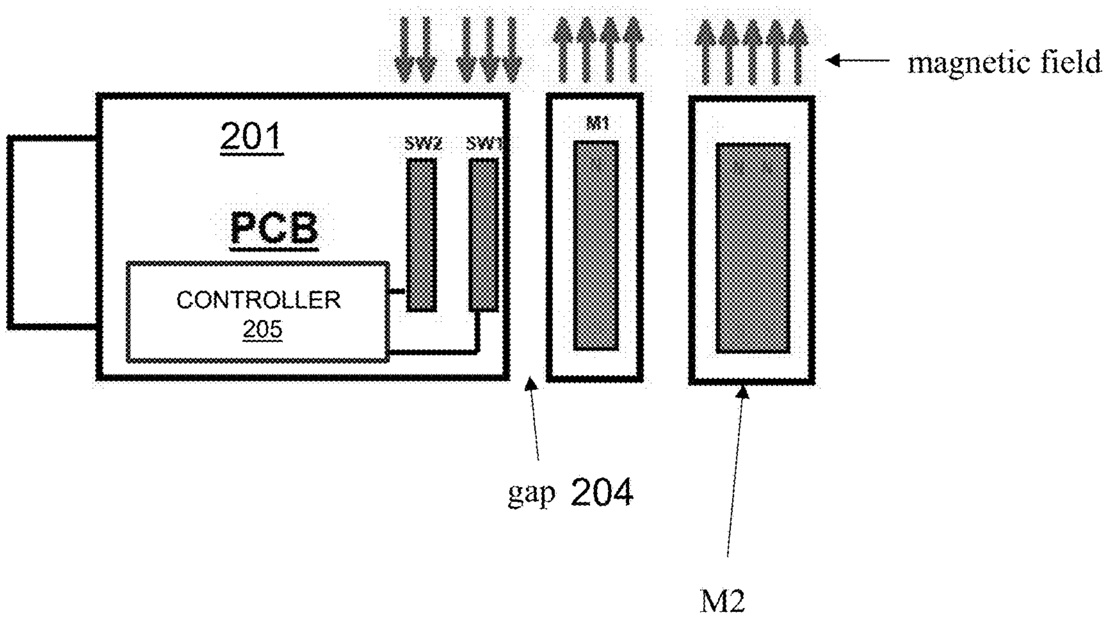
FIG. 5 is a diagram of a tamper state of the high-security RF signaling device according to the embodiment.

The second switch SW2 can be configured to detect tampering. More specifically, the second switch SW2 can be configured to detect an attempt by a malicious actor to hide unauthorized opening/closing of the container 203 by using a tampering magnet. See FIG. 5. FIG. 5 illustrates tampering. A malicious actor can bring a tampering magnet M2 close to the actuator magnet M1 and the first switch SW1. Due to the proximity of the tampering magnet M2 to the first switch SW1, it may be possible that the first switch SW1 cannot detect that magnetic coupling with the actuator magnet M1 is broken, even when the container cover 202 is opened. However, the second switch SW2 can detect the presence of the tampering magnet M2, and the state of the second switch SW2 can change correspondingly to register the unauthorized opening/closing of the container 203 or attempted unauthorized opening/closing of the container 203.

Figure 3:
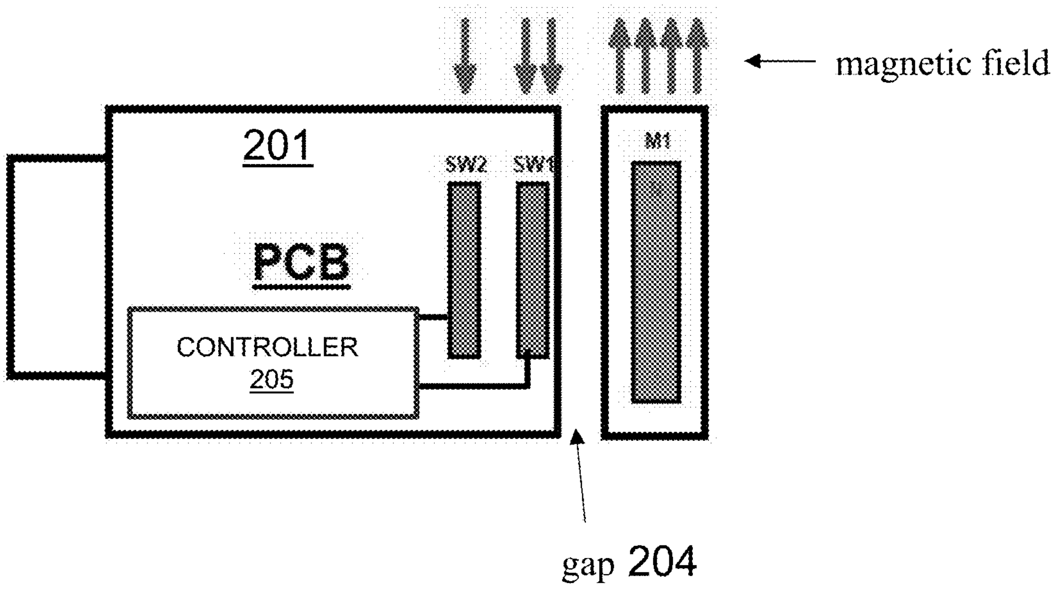
FIG. 3 is a diagram of a secure state of the high-security RF signaling device according to the embodiment.
Figure 4:
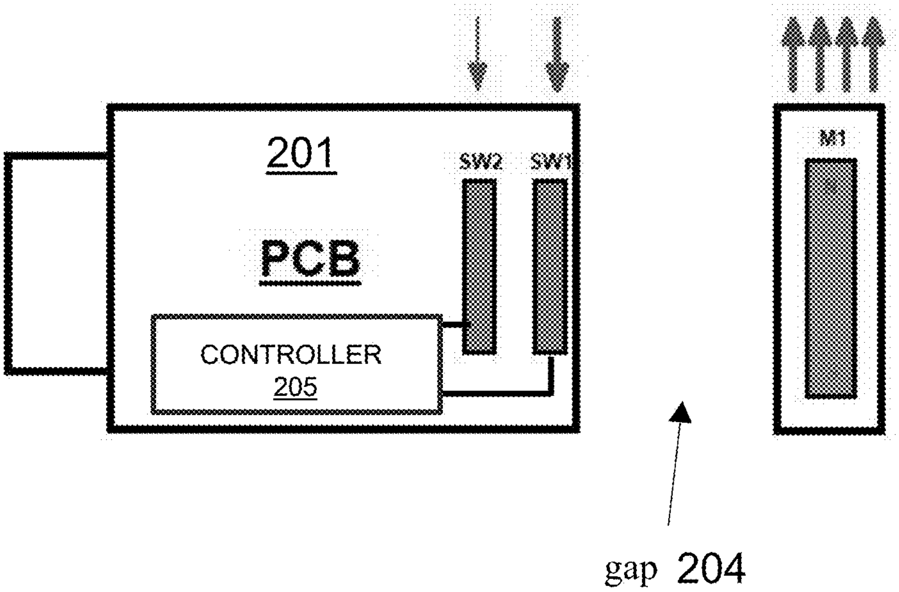
FIG. 4 is a diagram of an open-door state of the high-security RF signaling device according to the embodiment.

FIGS. 3 and 4 show the states of the second switch SW2 corresponding to a normal, secure closed-door state and open-door state, respectively. As shown in FIG. 3, in the normal, secure Close Door state, the actuator magnet M1 is located at a location such that the first switch SW1 and the second switch SW2 have different states. For example, in the first switch is ON and the second switch SW2 is OFF. Referring to FIG. 4, in the Open Door state, the actuator magnet M1 is comparatively distant from the first switch SW1 and the second switch SW2. Consequently, the magnetic field experienced by the first switch SW1 and the second switch SW2 due to the actuator magnet M1 is sufficiently weak that both the first switch SW1 and the second switch SW2 have a same state that indicates normal opening of the container 203. For example, both the first switch SW1 and the second switch SW2 are OFF.

As noted previously, FIG. 5 shows tampering. In FIG. 5, due to the presence of the additional tampering magnet M2, both the first switch SW1 and the second switch SW2 have a same state that indicates unauthorized opening/closing of the container 203. For example, the first switch SW1 is ON, but the second switch SW2 is also ON, indicating the unauthorized opening/closing of the container 203. That is, the second switch SW2 is configured to be turned ON by the presence of the additional magnet M2 in order to signal tampering.

As described previously, the high-security RF signaling device can transmit and receive information under control of the controller 205. For example, the high-security RF signaling device can transmit information to, and receive information from, a management device, such as 102 of FIG. 1. The information can be in the form of modulated electromagnetic radiation transmitted by the RF transceiver and the antenna in response to control signals from the controller, or modulated electromagnetic radiation received by the antenna, and processed and interpreted by the RF transceiver and the controller.

The high-security RF signaling device can transmit a signal to the management device. The signal can include a unique identifier of the high-security RF signaling device. In non-limiting embodiments, the unique identifier can include a MAC address of a Bluetooth™ device. In addition, the signal can include a status indicator, a firmware version, and a battery status (or any other information, for example, temperature). The signal can further include information indicating a count of the number of times that the door associated with the high-security RF signaling device has been opened and/or closed.

In response to the interrogation by a management device, each high-security RF signaling device can transmit a signal or signals indicating information about an associated door. The management device can receive the signals and update its display accordingly and store in a database, for example.

The high-security RF signaling device need not transmit the signal to indicate the information about the door only in response to interrogation by the management device. Alternatively, the high-security RF signaling device can continually or periodically transmit the signal indicating the information about the door independently of the interrogation, and the management device or other monitoring device can be configured to perform an operation continually or periodically, such as polling, to detect a change in the information. A transmission signal pattern may change due to event detection.

Referring to FIG. 2, the controller 205 can include a processor or microprocessor and a memory storing operations executable by the processor. The controller 205 can communicate via electric/electronic signals with components of the PCB 201 to cause the components to perform particular operations, and can communicate electronically with components external to the PCB 201, such as the management device 102. Additionally or alternatively, the controller 205 can include any of hardware, firmware or software combinations configured or configurable to carry out the methods and processes described herein, such as one or more ASICs (application-specific integrated circuits) configured to carry out the methods and processes. In particular, in response to signals from the first switch SW1 and the second switch SW2 indicating an opening/closing of the container 203, the controller 205 can increment a counter in an internal memory of the controller 205 or in a memory external to the controller 205, and record whether the opening/closing of the container 203 was authorized or unauthorized in the internal or external memory. In the example of FIG. 2, the controller 205 is coupled to a memory 206 on the PCB 201, which can be supplemental to an internal memory of the controller 205. The controller 205 can issue commands to an RF transceiver of the PCB 205 to cause the count information and the tampering information stored in the memory to be transmitted to the management device 102.

Figure 6:
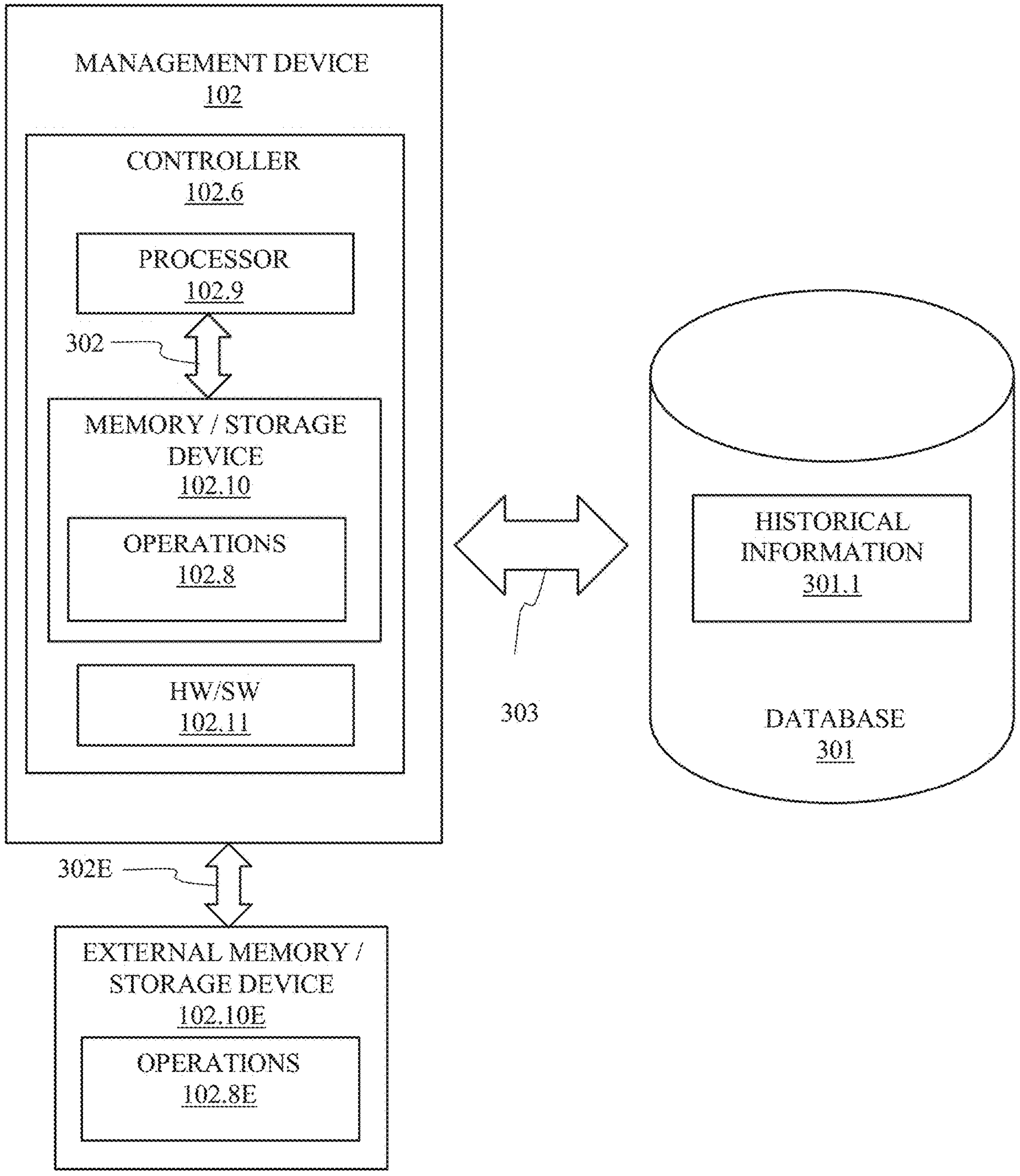
FIG. 6 shows a management device configured to communicate with the high-security RF signaling device.

FIG. 6 shows details of the management device 102. Referring to FIG. 6, a controller 102.6 of the management device 102 can include a processor 102.9 and a memory or other electronic storage device 102.10. The memory/storage device 102.10 can store operations 102.8. The processor 102.9 can communicate via signals 302 with the memory/storage device 102.10 to perform the operations 102.8 to implement the methods and operations described herein. The processor 102.9 can include, for example, a general-purpose CPU (central processing unit) configured to fetch and execute instructions, corresponding to operations 102.8, stored in the memory 102.10 to implement the methods and processes. Additionally, or alternatively, the controller 102.6 can include any other hardware, firmware or software combinations 102.11 configured or configurable to carry out the methods and processes, such as one or more ASICs (application-specific integrated circuits) configured to carry out the methods and processes. In light of the foregoing, the term "processor" as used herein is intended to encompass standalone processors, as distinct from memory, as well as the combination of a processor and a memory, typically referred to as a computer, as well as any other hardware, firmware or software combinations configured or configurable to carry out the methods and processes described herein. The memory/storage device 102.10 can include any kind of machine-readable medium configurable to store information electronically, such as RAM (random access memory) or ROM (read-only memory). The management device 102 can communicate with a memory/storage device 102.10 internal to the management device 102 or the controller 102.6 but is not limited in this regard. The management device 102 can also communicate, for example, via signals 302E with an external memory/storage device 102.10E storing processor-executable operations 102.8E to carry out the methods and processes described herein. The memory/storage device 102.10 and the external memory/storage device 102.10E can include any kind of machine or computer-readable media. Examples of machine/computer-readable storage media include, but are not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store information electronically and which can be accessed by a processor or computer. The management device 102 can communicate with a database 301 external to the management device 102 by electronically exchanging signals 303 with the database 301. The database 301 can be a machine/computer-readable storage medium along the lines described previously. The database 301 can store historical information 301.1. The historical information 301.1 can include information collected over a period of time concerning RF signaling devices and their associated containers. In response to a request from the management device 102, the database 301 can provide the historical information 301.1 to the management device 102. Further, the management device 102 can write or update or otherwise record new or changed historical information 301.1 to the database 301 at various intervals of time, thus collecting historical information regarding the RF signaling devices 101 and their associated containers.

It is to be understood that the embodiments described herein are not limited in terms of their application. The embodiments may be particular useful in, for example, an aircraft, due to the need for security when an aircraft is involved, and due to the many doors, compartments, containers and so on that exist on an aircraft, and the need to monitor their condition, both for security and for safety. However, the embodiments can also be useful in any number of other applications, including for example, commercial travel applications involving trains, buses, cars and the like, or as another example, commercial secure storage applications involving lockers and self-storage facilities and the like. Use in the home and residential settings is also possible.

It will be understood that the foregoing description is provided for illustration only, and not for limitation of the appended claims and their equivalents. It will further be understood that the above-described exemplary embodiments are susceptible to various modifications, changes and adaptations, and the same are intended to be comprehended within the meaning and range of equivalents of the appended claims.

What is claimed is:

1. An RF signaling device configured to detect tampering with a door or cover of an opening of a compartment or container, the RF signaling device comprising:

a controller;

an actuator magnet;

a first magnetic switch coupled to the controller and to the actuator magnet; and a second magnetic switch coupled to the controller;

wherein the first magnetic switch is configured to detect normal opening or closing of the door or cover based on proximity to or separation from the actuator magnet and signal the normal opening or closing to the controller;

the second magnetic switch is configured such that a state of the second magnetic switch is not affected by the actuator magnet, and to detect tampering with the door or cover by an external tampering magnet and signal the tampering to the controller; and the controller is configured to determine that the tampering by the external magnet has occurred in response to the first magnetic switch and the second magnetic switch having a first same state.

2. The RF signaling device of claim 1, further comprising a memory;

wherein the controller is further configured to increment and store in the memory a count of tampering events in response to the tampering.

3. The RF signaling device of claim 2, wherein the first magnetic switch has a different sensitivity from a sensitivity of the second magnetic switch.

4. The RF signaling device of claim 2, comprising:

a first part configured to be housed in or attached to the door or cover, the first part including the controller, the first magnetic switch and the second magnetic switch; and a second part configured to be housed in or attached to the compartment or container, the second part including the actuator magnet.

5. The RF signaling device of claim 1, wherein:

the first magnetic switch and the second magnetic switch are configured to take on different states to indicate the normal closing, and take on a second same state different from the first same state to indicate the normal opening.

6. The RF signaling device of claim 4, wherein:

the first part has an edge configured to be disposed opposite to an edge of the second part, the first magnetic switch is arranged to be substantially parallel to the edge of the first part and to the actuator magnet, and the second magnetic switch is arranged to be substantially parallel to the first magnetic switch and located farther from the first edge than is the first magnetic switch, so that the state of the second magnetic switch is not affected by the actuator magnet.

7. The RF signaling device of claim 1, wherein the RF signaling device is configured to communicate with a management device to report detecting of the tampering.

8. A security system, comprising:

a compartment or container having a door or cover;

a security device associated with the compartment or container, the security device including a controller, an actuator magnet;

a first magnetic switch coupled to the controller and to the actuator magnet, and a second magnetic switch coupled to the controller;

wherein the first magnetic switch is configured to detect normal opening and closing of the door or cover based on proximity to or separation from the actuator magnet and signal the normal opening and closing to the controller;

the second magnetic switch is configured to be unaffected by the actuator magnet and detect tampering with the door or cover by an external magnet and signal the tampering to the controller; and the controller is configured to determine that the tampering by the external magnet has occurred in response to the first magnetic switch and the second magnetic switch having a same first state.

9. The security system of claim 8, wherein the security device comprises:

a first part housed in or attached to the door or cover, the first part including the controller, the first magnetic switch and the second magnetic switch; and a second part housed in or attached to the compartment or container, the second part including the actuator magnet.

10. The security system of claim 9, wherein:

in a normal closed condition of the compartment or container, the first magnetic switch and the second magnetic switch have different states, indicating the normal closed condition; and in a normal open condition of the compartment or container, the first magnetic switch and the second magnetic switch have a second same state different from the first same state, the second same state indicating the normal open condition.

11. The security system of claim 9, further comprising:

a management device configured to communicate with the first part.

12. A method comprising, in a security device including a controller, a first magnetic switch, a second magnetic switch and an actuator:

positioning the first magnetic switch relative to the actuator so as to be magnetically coupled to the actuator;

positioning the second magnetic switch relative to the actuator so as to be unaffected by the actuator;

detecting normal opening or closing of a compartment or container associated with the security device by the first magnetic switch, and signaling the normal opening or closing to the controller, and detecting unauthorized opening or closing of or tampering with the compartment or container by the second magnetic switch, and signaling the unauthorized opening or closing or tampering to the controller;

wherein the detecting the unauthorized opening or closing or tampering comprises detecting, by the second magnetic switch, a presence of an external tampering magnet; and in response to the presence of the external magnet, the first magnetic switch and the second magnetic switch take on a first same state.

13. The method of claim 12, wherein the detecting the normal closing comprises determining that the first magnetic switch and the second magnetic switch have different states.

14. The method of claim 13, wherein the detecting the normal opening comprises determining that the first magnetic switch and the second magnetic switch have a second same state different from the first same state.

* * * * *